United States Patent [19]
Pasbrig

[11] 3,718,951
[45] March 6, 1973

[54] ROPE CLAMP

[76] Inventor: Max Pasbrig, Casa Luce-Via all-'Eco, Orselina, Switzerland

[22] Filed: Jan. 15, 1971

[21] Appl. No.: 106,664

[30] Foreign Application Priority Data

Jan. 19, 1970 Germany.....................P 20 02 184.5

[52] U.S. Cl. .................................24/126, 24/132 R
[51] Int. Cl. ..............................................F16g 11/04
[58] Field of Search...221/230 AT, 134 KD, 230 A, 126, 24/136, 263 B, 249 PP, 249 HL, 249 R, 263 DL, 263 P, 249 DP, 134 W, 134 CP, 134 N, 251, 132 WL, 132 R; 279/37, 57, 107, 55, 1 F, 35; 294/115, 1 R, 86.3

[56] References Cited

UNITED STATES PATENTS

| | | | |
|---|---|---|---|
| 1,710,273 | 4/1929 | Sebring | 24/134 KD |
| 3,294,444 | 12/1966 | Anderson | 24/230 AT |
| 32,210 | 4/1861 | Soule | 24/126 R |
| 589,224 | 8/1897 | Samuelson | 24/126 |
| 1,634,422 | 7/1927 | Holmes | 279/107 |
| 3,413,692 | 12/1968 | Pressley | 24/230 AM |

*Primary Examiner*—Bernard A. Gelak
*Attorney*—Curtis, Morris & Safford

[57] ABSTRACT

The specification describes a rope clamp with at least one clamping body, which can be moved between wedge-shaped guiding faces. A rear part of the clamping body remote from the rope is constructed as a pivoting edge or is rounded and on actuation of the clamp the clamping body slides into its clamping position with the rear part on an associated guiding face comes into engagement with the rope. Following this the clamping body swings about the pivoting edge as a pivot axis until the whole clamping face lies against the rope.

The clamping face is so arranged that in the clamping position the front edge of the clamping face lies behind, in terms of the pulling direction, a line drawn perpendicular to the direction of pulling through the axis of rotation or at the most lies on this axis. Furthermore for actuating the clamp to release it the clamping body is first swung about its axis of rotation formed by its pivot edge before it begins its sliding movement on the guiding face.

7 Claims, 4 Drawing Figures

INVENTOR:
MAX PASBRIG

PATENTED MAR 6 1973 3,718,951

INVENTOR:
MAX PASBRIG

BY:
Curtis, Morris & Safford
HIS ATTORNEYS

ROPE CLAMP

BACKGROUND OF INVENTION

1. Field to Which Invention Relates

The present invention relates to rope clamps and more particularly to rope clamps comprising a clamping part which can be moved between wedge-shaped guide faces. In the present specification and claims the expression rope is to be taken to cover cables, cords and other like materials.

2. The Prior Art

In accordance with one prior proposal a slackening clamp for overhead lines or ropes was to comprise a clamp body with a lateral longitudinal opening. In the interior space of the clamp body two clamping jaws, wedge-shaped externally, were provided opposite each other so as to be capable of sliding. The ends with the lesser wedge height of the gripping or clamping jaws were connected respectively with ends of equally long limbs of an opening spring made of spring wire. The cross part of the spring was arranged so as to be perpendicular to the spring plane. The spring length between the transverse part of the spring and the clamping jaw is so selected that when the opening spring is inserted into the clamping body the insertion of the line or rope is possible both into the longitudinal opening of the clamping body and also from the direction of the end faces of the clamping jaws. However, no means are provided for bringing about release of the clamping action, something which constitutes a disadvantage in many applications. In particular it is a disadvantage that the rope must be completely freed of tension for releasing the clamping action. Similar disadvantages are also present in a connecting sleeve for overhead lines in which a double-conical sleeve is provided with clamping jaws arranged in it. Also a known rope clamp with a wedge mounted in it has substantially the same disadvantages.

In accordance with a further prior proposal a device for the releasable clamping of at least one line or rope or the like was to be provided with a housing which has at least one internal hole accepting at least one spring-loaded axially displaceable clamping body which clamps the inserted rope with an automatic locking action. The hole was to be associated with at least one further hole running obliquely in relation to it and which forms a chamber with it in which the clamping body was to be arranged and connected in a pivoting manner with the spring associated with it. For releasing the clamping action and for withdrawing the clamping body an externally accessible actuating element was to be provided on whose actuation the clamping body was firstly moved out of its clamping position in the axial direction of the holes with a pivoting action and, when this had been done, was to be withdrawn. As a result the force, necessary for releasing the clamping action and applied to the actuating element, was reduced so that the above-mentioned disadvantages could be substantially avoided. It would, however, be desirable to provide for a still further reduction of the force applied to the actuating sleeve, which is necessary for releasing the self-locking clamping action. This applies more particularly for cable clamps used for clamping cables or the like which are subjected to high tension stresses, since the force required for release also increases with the magnitude of the tension in the cable.

SUMMARY OF INVENTION

On the basis of the above considerations it is therefore one aim of the invention to provide an improved rope clamp in which the force for releasing the self-locking clamping action is as low as possible and the release of the self-locking action can take place even with extremely high tension forces without previously releasing the tension in the rope. This aim is achieved in that the clamping part forming a clamping body is provided on its rear part remote from the rope with a pivoting edge or is rounded, and in this respect more particularly the extended end of the clamping part is guided by means of a transverse pin in a longitudinally moving part, more particularly using a slot guide, so that the clamping part is swung positively after sliding on its conical guide face about its pivot edge and finally the front edge of the clamping face lies behind, in terms of the direction of pull, a line perpendicular to the direction of pull and passing through the pivot axis, or at the most lies on this line.

A rope clamp in accordance with the invention possesses more particularly the advantage that even in the case of high rope tensions the rope does not have to be slackened off before the rope tension can be released, since with the rope clamp in accordance with the invention the force required for release is not proportional to the tension force in the clamp, as is the case with the previously proposed rope clamps, but in accordance with the invention the release force, which is moreover very small, is practically independent from the tension force acting on the rope. The automatic locking action can therefore be released by hand, even if the rope is subjected to a tension load of several tons. Furthermore there is the advantage that on releasing the clamping action any damage to the rope is avoided.

The advantages obtained with the invention are due to the fact that two possibilities of movements are provided for the clamping part forming one clamping body. In accordance with the invention a rotary or rocking movement is coupled with a longitudinal movement in such a manner that the clamping body located in its withdrawn position firstly carries out, after the insertion of the rope, a longitudinal movement, until it comes into engagement with the rope, following which it then carries out a pivoting or rocking movement until its clamping face lies fully against the rope. If the rope is subjected to a very large tension force, the clamping body then carries out a further longitudinal movement which leads to a self-locking action which becomes stronger and stronger. For release the clamping body is first swung or rocked, something which is possible, in the case of a suitable construction and arrangement, even when the rope is under a high tension load. Owing to the rocking or tilting movement, however, the friction force between the clamping force of the clamping body and the rope is substantially decreased so that the clamping body can now begin to perform its longitudinal movement into the release position.

In accordance with a preferred embodiment of the invention the longitudinal moving part is an actuating sleeve which is subjected to spring loading.

In accordance with a still further preferred feature of the invention between the actuating sleeve and the gripping part there is a further spring element which tends to twist the clamping part into its position swung away from the rope. In the case of this embodiment two springs are thus required, of which one is connected with movement of the clamping part in the longitudinal direction of the rope and the other with the rotary movement of the clamping part.

In this respect it is, however, significant that the spring concerned with the movement in the longitudinal direction tends to move the clamping part into engagement with the rope, while the other spring swings the clamping part into the release position. Since the first-mentioned spring is substantially stronger in construction there is the consequence of this arrangement that the clamping part is moved towards the rope in its swung away position and its back part reaches the furthest forward position, that is to say the furthest forward position in the direction of tension of the rope. When this position is reached it is swung on the one hand by the pressure of the first mentioned spring and by a pulling force acting on the rope against the direction of action of the second spring. The cooperation specified of the springs is convenient, since in this manner the rope clamp functions particularly well and more particularly the clamping parts are held away from the rope during their release movement. It is also possible to provide a still further spring which presses the clamping part with its back part against the associated guide face. This function can, however, be taken over by the spring bringing about the rotary movement of the clamping part.

In accordance with a further preferred embodiment of the invention two or more gripping parts engage opposite parts of the rope in a previously proposed manner and the guide faces associated with gripping parts run in a wedge shaped manner towards each other in the direction of pull on the rope. This embodiment offers a still higher degree of reliability. Furthermore it is possible with one and the same rope clamp to clamp ropes which have very different diameters.

It is convenient when the slots of the slot guide means run obliquely or in a curved manner in relation to the direction of pull. It is advantageous if the housing is box-shaped and the actuating sleeve is made up of a ring of rectangular cross-section. Furthermore on the front and rear narrow surfaces of the housing inlet and outlet openings for the rope can be provided. Furthermore on the narrow longitudinal surfaces of the housing recesses can be provided in which helical springs are accommodated.

LIST OF SEVERAL VIEWS OF DRAWINGS

The invention will now be described in more detail with reference to the accompanying drawings and the following description of embodiments.

DESCRIPTION OF PREFERRED EMBODIMENTS

Figure 1:
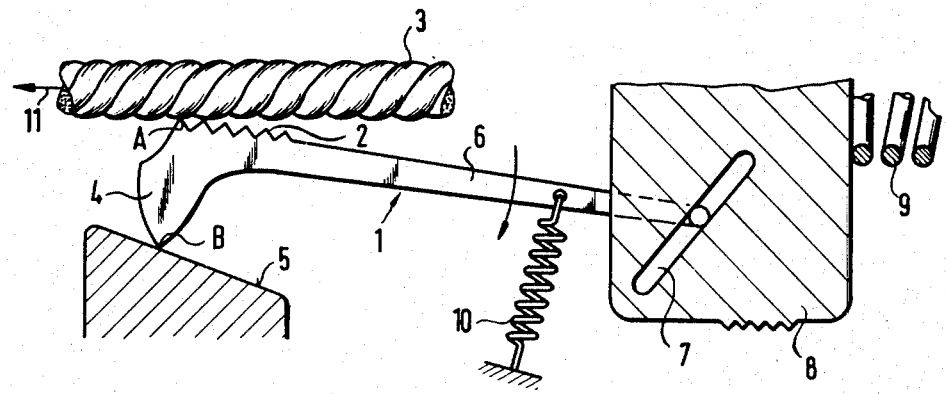
FIG. 1 is a diagrammatic view for explaining the gripping principle forming the basis of the invention.

An elongated clamping or gripping body 1 is provided with an elongated gripping face 2 for frictional clamping of a rope 3. At its inner end 4 the clamping body 1 is rounded or constructed as a fulcrum. Its back part 4 lies against a guide face or inner end 5 which runs in a wedge-shaped or conical manner.

The gripping or clamping body 1 has a shank 6, whose end is guided in a cam slot 7 of an actuating sleeve or slide member 8. The actuating sleeve 8 is loaded by an associated spring 9.

When the actuating sleeve 8 is withdrawn, the shank 6 of the gripping or clamping body 1 moves in the slot 7. It can be supported in this movement by a further spring 10. When the front or leading edge A of the gripping or clamping face 2 lies behind, in terms of the tension direction denoted by the arrow 11, the rounded abutment B of the inner end 4 of the clamping body 1 or in a vertical line in relation to the direction of tension, or possibly somewhat in front of it, the rocking or pivoting movement of the clamping body 1 occurs without any substantial application of force. It is correspondingly also possible to release ropes under tension from the clamping action.

On further movement backwards of the actuating sleeve 8 the clamping body 1 will then begin its sliding movement on the guiding face 5, so that it comes further and further away from the rope 3.

Figure 2:
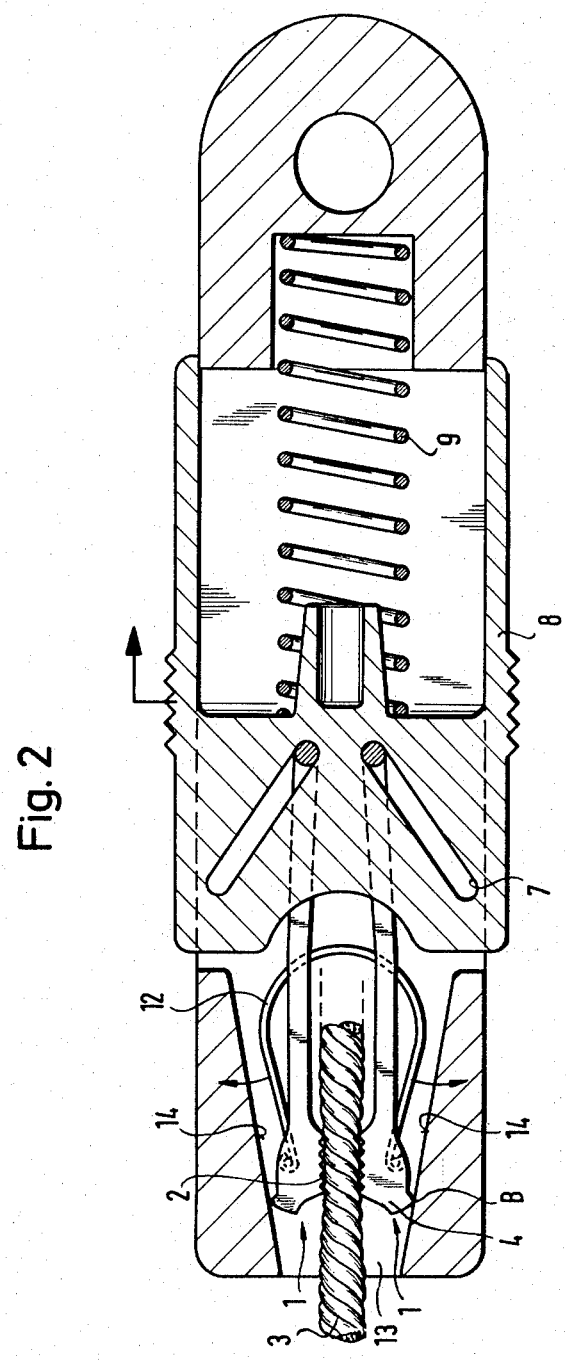
FIG. 2 is a section of a first embodiment of the invention.

In the case of the embodiment of the invention shown in FIG. 2 a rope 3 runs on the front end 13 of a substantially round and sleeve-shaped clamping member. On the inner end there is a conically shaped guide face or inner cam surfaces 14 for two elongated clamping members 1, which in accordance with the principle shown in FIG. 1 are guided in slots 7 of an actuating sleeve or slide member 8. A shackle spring 12 urges the clamping body 1 into their position swung away from the rope and at the same time ensures that the clamping members 1 are held abutting against their associated abutting cam surfaces 14 when the actuating sleeve 8 is pressed back against the action of the spring 9 associated with it.

Figure 3:
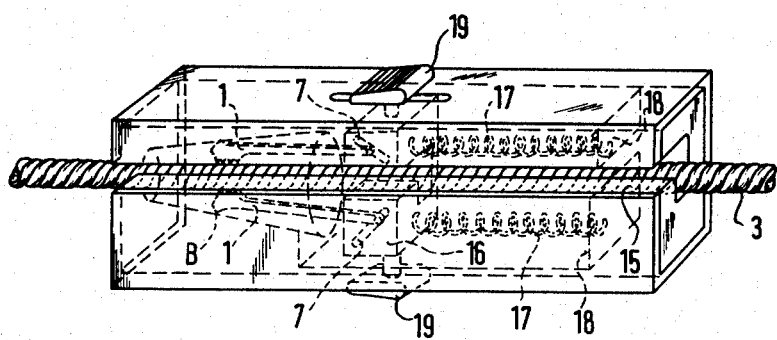
FIG. 3 is a view, partly in phantom, of a second embodiment of the invention.
Figure 4:
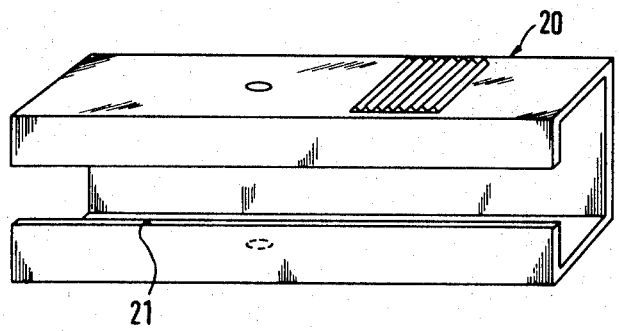
FIG. 4 shows an actuating sleeve suitable for use in the embodiment of FIG. 3.

In the case of the embodiment of the invention shown in FIG. 3 the housing of the rope clamp is constructed in the form of a box. The guidance of the clamping bodies 1 is ensured by means of cam slots 7 which are provided in an U-shaped slide 16. Two helical springs 17 act upon the slide 16. The springs 17 are placed from below and from above in corresponding recesses 18 in the housing. The actuation of the U-shaped slide 16 is carried out by means of handles or lugs 19, or alternatively by means of an actuating sleeve 20 as shown in FIG. 4.

As is shown more especially in FIG. 1, the abutment surface 2 of the gripping or clamping body 1 is grooved or otherwise roughened. This increases the friction occurring, as may be very convenient, more especially in the case of very smooth ropes.

In the case of the embodiment of the invention shown in FIG. 3, in which the housing of the rope clamp is constructed in the form of a box, a lateral slot 15 is provided which makes possible insertion of the rope 3 from the side. There is therefore with this embodiment of the invention the advantage that the rope does not have to be threaded through the length of the housing from the front and can instead be easily placed in from the side. The actuating sleeve 20 shown in FIG. 4, which can be used for actuating the U-shaped slide 16 in the embodiment of the invention in accordance with FIG. 3, is also provided with a lateral slot 21 so that the lateral insertion of the rope 3 is not obstructed.

It is significant that the clamping body is positively rocked or swung after completion of its sliding movement about its fulcrum when the actuating sleeve moves further forwards owing to its spring loading, preferably in the direction of pull on the rope.

Even although guidance by means of slots for achieving a connection of the clamping bodies or the clamping part with a longitudinally moving part constructed more particularly as an actuating sleeve is more particularly preferred, it is, however, possible, as can be readily seen, also to provide any other type of guiding means which provide for the two possibilities of movement, in accordance with the invention, of the clamping or gripping part.

Preferably all parts can be made of plastics material, more particularly including the springs, in order to ensure a high degree of resistance to corrosion.

It will be noted that in the embodiments of the invention and angle between the gripping face of the clamping part and a line between the front edge of the clamping face and the pivot point against the guide surface makes an angle of at least 90°, that is to say in most cases somewhat more than 90°.

What I claim is:

1. A releasable clamp comprising
   a. an elongated housing having a longitudinal axis, an inner end and an outer end, said inner end having an inner cam surface converging with the longitudinal axis toward the inner extremity thereof,
   b. a slide member longitudinally movable relative to said housing and having a cam slot diverging from said longitudinal axis toward the inner end of the housing,
   c. an elongated clamping member within said housing having an inner end and an outer end, the inner end having an elongated gripping surface with a leading edge at the inner end thereof at one side adjacent said longitudinal axis and a rounded abutment on the other side for slideable and rocking engagement with said inner cam guide surface, the outer end of said clamping member comprising a shank portion and a cam follower engageable with the cam slot, and
   d. spring means biased to slide the slide member toward the inner end for longitudinal movement of the clamping member from a release position toward the inner end until the converging cam guide surface brings the leading edge of the gripping surface into engagement with the object to be clamped and thereafter to lock the clamping member by rocking said member about the point of contact of said abutment with said cam surface by the camming action of the cam slot until the remainder of the gripping surface firmly engages the object to be clamped.

2. A clamp as defined in claim 1 wherein the longitudinally movable slide member is actuated and controlled by a sleeve member at least partly surrounding and slideable on the housing.

3. A clamp as defined in claim 1 wherein the cam follower on the shank of the clamping member is a transverse pin.

4. A clamp as defined in claim 1 wherein the housing has a longitudinal slot in one side and along the length thereof for lateral insertion of the object to be clamped.

5. A clamp as defined in claim 1 wherein the housing has a longitudinal slot in one side and along the length thereof for lateral insertion of the object to be clamped and the slide member is actuated and controlled by a sleeve member slideable on the housing and having a corresponding longitudinal slot.

6. A clamp as defined in claim 1 having two opposed elongated clamping members actuated by opposed converging cam slots, cam surfaces and cam followers.

7. A clamp as defined in claim 6 wherein the opposed clamping members are additionally spring-biased against the opposed guide surfaces.

* * * * *